United States Patent [19]

Pastor

[11] Patent Number: 4,582,579

[45] Date of Patent: Apr. 15, 1986

[54] METHOD FOR PREPARING CUPRIC ION-FREE CUPROUS CHLORIDE

[75] Inventor: Antonio C. Pastor, Santa Monica, Calif.

[73] Assignee: Hughes Aircraft Company, Los Angeles, Calif.

[21] Appl. No.: 686,056

[22] Filed: Dec. 24, 1984

[51] Int. Cl.[4] ............................................. C25B 1/26
[52] U.S. Cl. .................................... 204/94; 204/277; 423/493
[58] Field of Search .......................... 204/94; 423/493

[56] References Cited

U.S. PATENT DOCUMENTS

| 829,778 | 8/1906 | Granier | 204/94 |
|---|---|---|---|
| 1,964,569 | 6/1934 | Gernes | 423/493 |
| 2,049,402 | 7/1936 | Wernlund | 423/493 |
| 2,468,766 | 5/1949 | Low | 204/94 |
| 3,129,152 | 4/1964 | Teske et al. | 204/94 |

Primary Examiner—T. Tung
Attorney, Agent, or Firm—John A. Sarjeant; A. W. Karambelas

[57] ABSTRACT

An improvement of the method for preparing cupric ion-free cuprous chloride powder in which copper metal is added to a highly acidified solution of cupric chloride to reduce the cupric ions to cuprous ions and oxidize the copper metal to cuprous ions. The improvement involves applying an electromotive force to the solution by immersing interconnected copper and platinum electrodes in the solution. The electromotive force is applied only after the reduction of cupric ions is near completion. The electromotive force is applied for a sufficient time to insure essentially complete reduction of cupric ions in the solution. Cuprous chloride is then separated from the cupric ion-free solution by evaporation and isolated by conventional techniques to provide an improved cuprous chloride powder product which is essentially free of cupric ions. The electromotive force is also applied during the evaporation of the acidified solution to prevent possible cupric ion formation. Removal of anion impurities from the cupric ion-free cuprous chloride powder is also disclosed.

12 Claims, 1 Drawing Figure

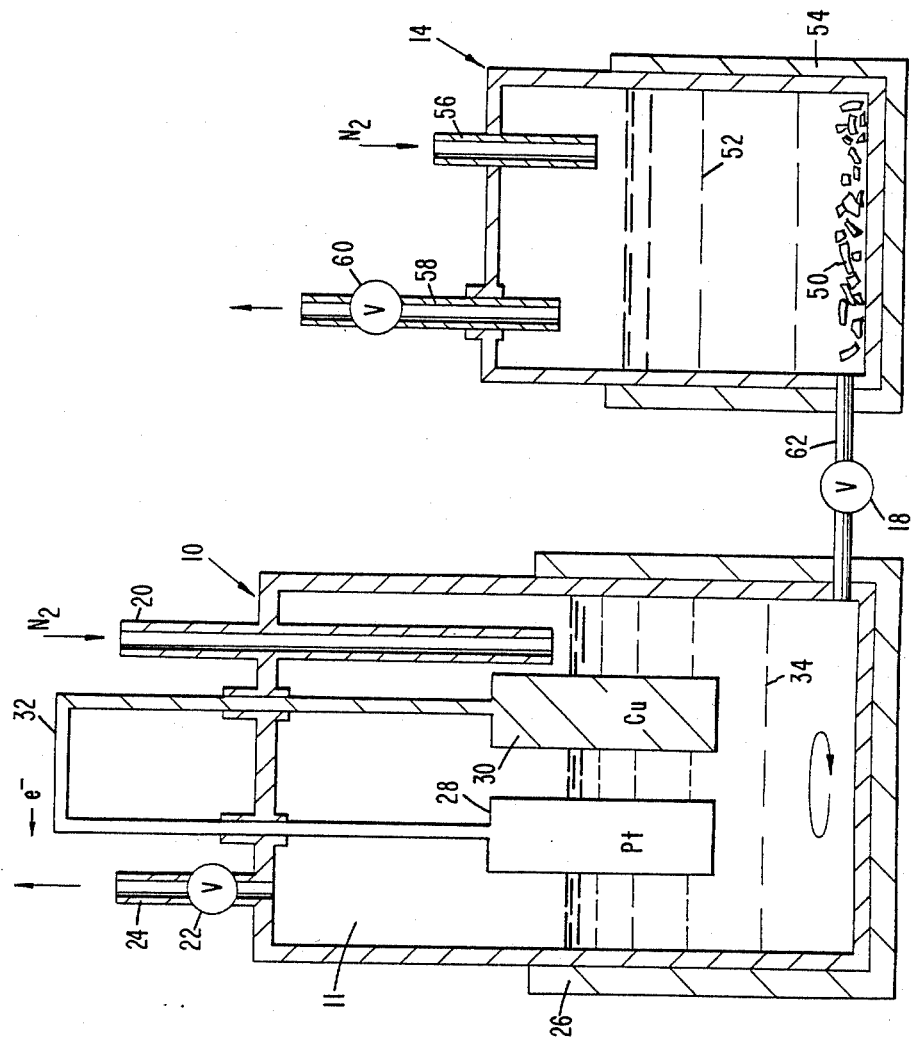

METHOD FOR PREPARING CUPRIC ION-FREE CUPROUS CHLORIDE

BACKGROUND OF THE INVENTION

The present invention relates generally to methods and systems for preparing ultra pure cuprous chloride (CuCl). More particularly, the present invention relates to an improved method and system for preparing CuCl by the reduction of cupric chloride (CuCl$_2$) to cuprous chloride in the presence of copper metal.

Ultra pure CuCl crystals which are free of cupric ion (Cu++) are useful as an optically nonlinear material that has wide applications for use in electro optic and integrated optic systems. In order for the CuCl crystals to be suitable for such applications, it is essential that the CuCl be free of cupric ions. Due to size and charge disparities, cupric ions cannot substitute for cuprous ions (Cu+) in the cuprous chloride crystal lattice. Unless there are present other impurity species that are size and/or charge-compensating, the cupric ions can only occupy interstitial sites. As a result, the inclusion of cupric ions in the cuprous chloride crystal lattice produces cuprous ion vacancies and/or chloride ion interstices. Cuprous ion vacancies are by far more prevalent. When oxygen ion impurities are also present in the crystal lattice, the oxygen ions may substitute for chloride ions to coexist with either substitutional or interstitial cupric ions. In this fashion, the oxygen ions provide stabilization of the cupric ion within the cuprous chloride crystal lattice. This makes it even more difficult to rid the cuprous chloride crystal or powder of the undesirable cupric ions.

The conventional method of preparing cuprous chloride powder involves immersing copper metal in an aqueous solution of cupric chloride that is highly acidified with hydrochloric acid and blanketed by an inert gas such as nitrogen. The reaction which takes place is:

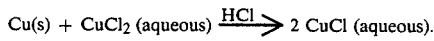

This conventional method is based on a heterogeneous reaction, i.e., one involving reactants in the solid state (copper metal) and liquid solution (CuCl$_2$). The rate at which the process occurs is limited in its early stages by the magnitude of the liquid-solid interfacial area. Further, as the concentration of reactants in the liquid solution diminishes, the reaction rate decelerates so that the reaction cannot be completed within time intervals of practical duration. In order to speed up the reaction, copper metal in a high surface-to-volume form, such as powder or turnings is used and the reaction mixture is heated to below boiling temperature. This provides increased initial reaction rates, but even then, the reaction rate slows considerably near the end point. As a result, the end point of the reaction cannot be reached within realistic time intervals.

Cupric chloride solution is dark green in color and turns very dark brown upon contact with the copper powder or turnings. The brown coloration gets lighter with the progress of the reaction. The solution becomes colorless when the reaction is complete. However, as mentioned above, the end point of the reaction cannot be reached within a realistic time interval using stoichiometric amounts of copper metal and cupric chloride solution, so that a small amount of cupric ions remain in the solution. Stoichiometric, as used herein, means that when the reaction is complete there are no leftover amounts of either reactant.

Cuprous chloride is very soluble in hydrochloric acid, but only slightly soluble in water. A highly HCL-acidified aqueous medium is used to prevent the premature precipitation of the curpous chloride. Precipitation of cuprous chloride during the reaction is undesirable, since the cuprous chloride precipitates on the surface of the copper metal and hinders the progress of the reaction.

In conventional processes, when the solution is as near to its end point as patience and economics will allow, any excess copper metal is retrieved and the solution is diluted with deoxygenated water in order to reduce its acidity and bring about the precipitation of the cuprous chloride. The precipitate is then filtered off, washed down sparingly with chilled deoxygenated water and vacuum dried. This entire series of steps must be carried out under a blanket of inert gas. Since it is difficult to retrieve any excess copper which may be left in the solution, the reaction is conventionally carried out with an excess of cupric chloride. The excess cupric chloride insures complete copper metal consumption and stays in solution when the solution is diluted and separated from the cuprous chloride precipitate. However, the excess cupric chloride in the solution is undesirable because it provides a possible source of cupric ions to contaminate the cuprous chloride powder.

Cuprous chloride powder prepared according to the above conventional process is available in the high-purity materials market as a powder that is five nines pure (99.999%) on a "metal basis". However, this manner of specification does not regard cupric ions as an impurity in cuprous chloride. As a result, the cuprous chloride powder may include varying amounts of cupric chloride. This explains why the market-variety cuprous chloride comes in the form of a powder that is various shades of green. Cupric ion-free cuprous chloride powder should be white.

It would be desirable to provide a method and system for preparing white cuprous chloride powder which is essentially free of cupric ion and which can be used in the preparation of ultra pure cuprous chloride crystals for use in electro optic and integrated optic system. Further, it would be desirable to provide a method in which the reaction time for the complete conversion of cupric ions to cuprous ions is reduced.

SUMMARY OF THE INVENTION

In accordance with the present invention, a method for preparing cuprous chloride powder from acidified cupric chloride solution and metal copper is provided in which the final cuprous chloride powder product is essentially free of cupric ion and is white in color. The method is based upon the use of an electromotive force which is applied to the solution prior to and during separation of the cuprous chloride powder to promote and insure the complete reduction of cupric ion to cuprous ion. The electromotive force is applied to the solution prior to separation of the cuprous chloride for a sufficient time to convert substantially all of the cupric ions to cuprous ions to provide and maintain a colorless solution from which cuprous chloride can be recovered as a white powder which is essentially free of cupric ion. The electromotive force is also applied to the solution during separation of the cuprous chloride powder from the solution. This feature insures that any cupric ions which may form during separation of the cuprous chloride from the solution are reduced to cuprous ions.

The method in accordance with the present invention includes the steps of adding copper metal to a dark green colored aqueous solution of cupric chloride. The aqueous solution is acidified with sufficient hydrochloric acid to prevent precipitation of the cuprous chloride which is formed in the acidified aqueous solution during reduction of the cupric chloride by the copper metal. When the reduction of the cupric chloride nears completion, an electromotive force is applied to the solution to promote and insure the complete reduction of cupric ion to cuprous ion. The electromotive force is applied for a sufficient time to insure complete conversion of essentially all of the cupric ions to cuprous ions to provide and maintain a colorless solution which is essentially free of cupric ions. The cuprous chloride is then separated from the clear solution by evaporation of the solution to provide the desired white cuprous chloride powder which is essentially free of cupric ion. As previously mentioned, the electromotive force is continually applied as the solution is evaporated to insure that cupric ions are not formed.

As a feature of the present invention, the electromotive force is applied to the solution by an electric circuit formed when an interconnected platinum metal electrode and copper metal electrode is immersed in the solution.

As mentioned in the Background of the Invention oxygen ion impurities may also be present in the cuprous chloride powder. As a further feature of the present invention, the method includes the additional step of purifying the white cuprous chloride powder to remove anion impurities, such as oxygen, by conventional zone refining under an atmosphere of hydrogen chloride or phosgene gas in helium.

The method in accordance with the present invention, along with the system for carrying out the method, is advantageous over the prior conventional techniques for producing cuprous chloride, since it provides an improved product which is essentially cupric ion free and is substantially reduces reaction times necessary to produce this desired white cuprous chloride powder.

The above described and many other features and attendant advantages of the present invention will become apparent as the invention becomes better understood by reference to the following detailed description when considered in conjunction with the accompanying drawing.

BRIEF DESCRIPTION OF THE DRAWING

The drawing is a partial schematic representation of an exemplary system for carrying out the method in accordance with the present invention.

DETAILED DESCRIPTION OF THE INVENTION

The drawing shows a partially schematic representation of a system which can be used to carry out two preferred alternate methods in accordance with the present invention. The first preferred exemplary method utilizes only the electrochemical reactor 10. The second exemplary method utilizes a pre-reaction cell 14 in addition to the electrochemical reactor 10.

Both systems are designed to carry out the method in accordance with the present invention which includes the basic steps of: adding copper metal to a dark green colored aqueous solution of cupric chloride that is highly acidified with hydrochloric acid; reacting the copper metal with the cupric chloride to oxidize the copper metal and reduce the cupric ions; applying an electromotive force to the solution after the reduction of the cupric ion is near completion. The electromotive force is applied for a sufficient time to insure complete conversion of essentially all of the cupric ion to cuprous ions and to provide and maintain a colorless solution which is essentially free of cupric ions; and separating the cuprous chloride from the supernatant by evaporating the solution to provide cuprous chloride powder which is white and essentially free of cupric ion. The electromotive force is applied to the solution during evaporation to insure that no cupric ions are formed during evaporation of the solution which may precipitate out and contaminate the cuprous chloride powder.

In the first exemplary method, a dark green colored aqueous solution of cupric chloride which is highly acidified is placed in electrochemical reactor 10. The concentration of cupric chloride and hydrochloric acid in the solution may be within those limits which are conventionally known and used in the previously discussed well-known conventional cuprous chloride preparation method. Typically, the cupric chloride solution will be prepared by dissolving cupric oxide in concentrated hydrochloric acid. Cupric chloride crystals ($CuCl_2 \cdot 2H_2O$) may also be used as a starting material. The exact amount of cupric oxide added and the extent of dilution of the concentrated hydrochoric acid is not critical so long as the concentrations remain within conventional limits. The acidity of the solution will depend upon the amount of cupric oxide dissolved in the solution. In general, the solution preferably will be 12N HCL and will have a cupric chloride concentration of 0.5M to 1.2M.

When the solution is placed within the reactor 10, valve 18 is closed. Nitrogen or other suitable inert gas is introduced into the reactor 10 through inlet 20. Valve 22 is open to allow continual flow of nitrogen out of the reactor through outlet 24 to allow continual purging of the reactor atmosphere 11 with nitrogen. A heating mantle 26 is provided to heat the solution in order to speed up the reaction. Preferably, the solution is heated to between about 40°–45° C. during the initial reaction.

The first step of this exemplary process involves adding metallic copper to the highly acidic and highly concentrated dark green solution. The copper metal is preferably in the form of high surface area powder or turnings. The particular form in which the copper metal is added is not critical so long as a reasonably large surface area is provided in order to allow the reaction to proceed as quickly as possible. The copper may be added through inlet 20 or any other suitable inlet (not shown). The amount of copper is preferably between about 98 to 99.5 percent of the stoichiometric amount of copper metal necessary to completely react with and reduce the cupric ions present in the solution.

Upon addition of the copper metal to the cupric chloride solution, or vice versa, the conventional oxidation-reduction reaction in which copper metal is oxidized and cupric ions are reduced takes place. The reaction is allowed to proceed until all of the copper metal has been consumed. This provides a solution which has only 0.5 to 2.0 percent of the original cupric ion concentration and is typically light yellow in color.

After the copper metal has been consumed, an electromotive force is applied to the solution. As shown in the drawing, the preferred means for applying this electromotive force is by way of an interconnected platinum metal electrode 28 and copper metal electrode 30. The two electrodes 28 and 30 are electrically interconnected as represented schematically by line 32. When the platinum and copper electrodes are immersed in the HCL-acidified cupric chloride solution, an electric circuit is formed by the two pieces of unlike metals that is bridged by the solution. The interface between the copper metal and cupric chloride solution functions as an anode where the half cell reaction is: $Cu(s) \rightarrow Cu^+(aq) + e^-$. The interface between the platinum metal electrode and the cupric chloride solution will function as the cathode where the half reaction is: $Cu^{++}(aq) + e^- \rightarrow Cu^+(aq)$. The voltage source for this electrochemical cell will be the point of contact or junction 32 between the two metal electrodes. For each electron that traverses the junction, a cuprous ion will be formed at each electrode.

It was found that immersion of electrodes 28 and 30 into concentrated cupric chloride solutions resulted in a rapid anodic reaction which proceeds so rapidly that spalling of the copper metal electrode occurs. Spalling of the copper electrode is undesirable since the portions of the electrode which become detached during spalling lose contact with the platinum electrode and continue to react with the solution at a much reduced rate. Further, any particles produced during spalling must be retrieved from the solution. In order to minimize the possibility of spalling of the copper electrode 30, it is important that the electrodes 28 and 30 be immersed into the solution only after the initial reaction between the concentrated cupric chloride and copper metal has proceeded to a sufficient extent (i.e. 98 to 99.5 cupric ion reduction) to reduce the cupric ion concentration to a level that is below the level at which spalling of the copper electrode would occur.

In the first preferred method, the electrodes 28 and 30 are initially positioned at the top of the reactor 10 so that they are not in contact with the initial concentrated cupric chloride solution in the bottom of the reactor. As previously mentioned, concentrated cupric chloride solutions are considered to be those that have concentrations between about 0.5M to 1.2M. The electrodes 28 and 30 are kept away from the cupric chloride solution until essentially all of the initially added copper metal has been consumed. This will generally take from a few hours to overnight. The electrodes 28 and 30 are then immersed into the cupric ion depleted solution to provide the electromotive force and source of copper metal to completely reduce the remaining cupric ions in solution. The electrodes 28 and 30 are shown in the drawing at the point just after they have been immersed into the cupric chloride solution which has been depleted of from 98 to 99.5 percent of the cupric ions initially present by reaction with copper metal. The solution is preferably stirred during application of the electomotive force as represented by curved arrow 34. The solution is also preferably heated to between about 50°–55° C.

The electromotive force is applied to the solution for a sufficient amount of time to convert essentially all of the cupric ions to cuprous ions. The solution which is devoid of cupric ions will be clear. The electromotive force should be applied for a few hours to overnight. After the electromotive force has been applied for a sufficient time, the cuprous chloride is separated from the solution by evaporating the solution.

An important feature is that the electromotive force be applied to the solution during evaporation to insure that no cupric ions are formed and to insure that the precipitate is essentially cupric ion free. The electromotive force is applied until the solution is evaporated sufficiently to form a thick slurry. At this point, the electrodes 28 and 30 are removed and the slurry is evaporated to dryness to form the cupric ion free cuprous chloride powder. Nitrogen or other inert, non-oxygen containing gas is continually used to purge the reactor 10 in order to prevent oxidation of the cuprous chloride back to cupric chloride. The final white powder product is then removed from the reactor 10 for further purification to remove anion impurities or for further processing for use in electro optic and integrated optic systems.

If desired, water soluble ion impurities may be removed from the colorless cuprous chloride solution by diluting the highly acidic solution with deoxygenated water to precipitate out the cuprous chloride. The supernatant (including water soluble impurities) is then siphoned off. The remaining precipitate is redissolved in concentrated hydrochloric acid. The acid solution is then evaporated as described above with the electromotive force being applied during the evaporation. More than one dilution with deoxygenated water may be carried out if multiple precipitations and multiple removal of ion impurities are desired. However, it is important that when the final acidified solution is evaporated to dryness to form the cuprous chloride powder, that the electromotive force be applied to the solution during evaporation to insure that all of the cupric ions which may form are continually reduced to cuprous ions.

A second exemplary method utilizes a pre-reaction cell 14 to initially react copper metal with cupric chloride solution to produce a cuprous chloride solution having a relatively small amount of cupric ions. This cupric ion depleted solution is then passed to the reactor 10 for application of the electromotive force in accordance with the present invention. This second exemplary method is basically the same as the previously described method except that the initial copper metal reaction with cupric chloride takes place in a separate container 14. The amount of copper turnings 50 added to the concentrated highly acidified cupric chloride solution 52 is preferably in excess of the stoichiometric amount necessary to completely reduce cupric ions in the solution. A 50 percent excess of copper turnings is preferred. The solution is preferably warmed by heating mantle 54 to about 40°–45° C. to promote the reaction. Nitrogen or other suitable inert gas is introduced through inlet 56 and exits through outlet 58 and valve 60 to provide an inert atmosphere inside the pre-reaction cell 14.

The oxidation of copper metal turnings and the reduction of cupric ions is allowed to continue in the pre-reaction cell 14 until approximately 98 to 99.5 percent of the cupric ions have been reduced. This will usually take a few hours to overnight. A visual check to see that the solution is colorless or light yellow is sufficient to insure that the cupric ion concentration has been reduced sufficiently so that the electromotive force can be applied.

After the reduction of cupric ions has reached the desired level in the pre-reaction cell 14, the valve 60 is closed and valve 18 is opened. The solution is forced by nitrogen pressure through line 62 into the reactor 10 where the solution comes into contact with electrodes 28 and 30. An electromotive force is generated by the electrodes as previously described to complete the conversion of cupric ions to cuprous ions. The recovery of the cuprous chloride powder by evaporation of the solution in the reactor 10 is carried out the same as peviously described. Again, separation of the cuprous chloride powder is preferably carried out in the reactor 10 with electrodes 28 and 30 still immersed in the solution as the solution is evaporated as previously described.

A certain amount of oxygen and other anion impurities such as hydroxide may become incorporated into the cuprous chloride powder. It is preferred that the anion impurities be removed by conventional zone refining in a suitable atmosphere such as an atmosphere of hydrogen chloride gas and helium. The hydrogen chloride (HCl) gas acts as a scavenger of anionic impurities while the helium acts as a carrier gas and diluent. Phosgene gas may also be used in place of the HCl gas.

Zone refining is a conventional process initially developed at Bell Laboratories as a means of purifying semiconductor materials prior to crystal growth. Zone refining basically involves heating a well defined portion of a mass of cuprous chloride to molten form and then slowly migrating the heated zone through the rest of the mass. The impurities remain in the molten zone and are concentrated therein for removal. Conventional zone refining is usually used on bars or rods of solid materials through which the molten zone is migrated a number of times to remove impurities. Zone refining of cuprous chloride powder in accordance with the present invention is preferred since it not only removes undesirable anion impurities but also produces a clear (colorless) ingot of solid cuprous chloride which is easier to store than the relatively high surface area white cuprous chloride powder. The ingots are easier to store in isolation from air and they react much less readily with air during handling.

Examples of practice are as follows:

A one and a half liter capacity reactor cell made of Pyrex glass was charged with 48.2 grams (0.6066 gm-mole) of cupric oxide (CuO), 38.3 grams of copper metal turnings (99.5% of 0.606 gm-atm) and 1.2 liter of concentrated hydrochloric acid. The solution was maintained at a temperature of 45° C. under a nitrogen atmosphre. After approximately 15 hours, an electromotive force was applied to the slightly yellow solution using interconnected platinum and copper electrodes. The copper electrode had a mass of approximately 12 gms with approximate dimensions 12 cm×8 cm×0.025 cm. The mass of the copper electrode was much more than the amount of copper metal required to complete the reduction of cupric ions to cuprous ions. The platinum electrode was a piece of platinum foil with dimensions of 2 cm×7 cm×0.010 cm. The electromotive force was applied to the solution overnight which was a sufficiently long period to insure complete cupric ion reduction.

The acidified solution was evaporated off to leave a dry powder of around 120 grams (1.212 gm-mole) of cuprous chloride. The electrodes were left in contact with the solution during the precipitation and evaporation steps to prevent any possible oxidation of cuprous ion back to cupric ion. The resulting cuprous chloride powder was white and essentially cupric ion free.

Having thus described exemplary embodiments of the present invention, it should be noted by those skilled in the art that the within disclosures are exemplary only and that various other alternatives, adaptations and modifications may be made within the scope of the present invention. Accordingly the present invention is not limited to the specific embodiments as illustrated herein, but is only limited by the following claims.

What is claimed is:

1. A method for preparing white cuprous chloride powder which is essentially free of cupric ion, said method comprising the steps of:
    (a) adding copper metal to a dark green colored aqueous solution of cupric chloride, said aqueous solution being acidified with sufficient hydrochloric acid to prevent precipitation of the cuprous chloride formed in said acidified aqueous solution during reduction of said cupric chloride by said copper metal;
    (b) reacting said copper metal with said cupric chloride to thereby oxidize the copper metal to form cuprous ion and reduce the cupric ions to form cuprous ions;
    (c) applying an electromotive force to said solution by interconnecting a platinum metal electrode and a copper metal electrode immersed in said solution when the reduction of cupric ion to cuprous ion nears completion, said electromotive force being applied for a sufficient time to insure complete conversion of essentially all of said cupric ions to cuprous ions to provide a clear solution essentially free of cupric ions; and
    (d) separating said cuprous chloride from said solution by evaporating said solution to provide white cuprous chloride powder which is essentially free of cupric ion, said electromotive force being applied to said solution during said evaporation.

2. A method according to claim 1 wherein said dark green colored aqueous solution has a cupric chloride concentration of between 0.5M to 1.2M.

3. A method according to claim 2 wherein said electrodes are immersed in the solution only after the cupric ion concentration in said solution is reduced to 98 to 99.5 percent to prevent spalling of the copper metal electrode.

4. A method according to claim 3 wherein a sufficient amount of copper metal is added to said dark green solution to react with and reduce only about 98 to 99.5 percent of the cupric ion and wherein said electromotive force is applied to said solution only after said copper metal has been substantially consumed.

5. A method according to claim 3 wherein an amount of copper metal in excess of the amount necessary to reduce all of the cupric ions in the dark green solution to cuprous ions is added to said solution in a first reaction vessel wherein the reaction between said copper metal and said solution is allowed to continue without application of said electromotive force for sufficient time to convert at least about 98 percent of said cupric ions to cuprous ions to form a light yellow colored solution; said method including the additional steps of separating said light yellow solution from the unreacted copper metal and transferring only said light yellow solution to a second reaction vessel without exposure to air, and then applying said electromotive force to said light yellow solution in said second reaction vessel.

6. A method according to claim 1 including the further step of purifying said white cuprous chloride powder to remove anion impurities by zone refining.

7. In a method for preparing cuprous chloride powder wherein copper metal is immersed in a dark green colored aqueous solution of cupric chloride, said aqueous solution being acidified with sufficient hydrochloric acid to prevent precipitation of the cuprous chloride formed in said acidified aqueous solution during the reduction of said cupric chloride by said copper metal, said acidified solution turning brown upon immersion of the copper metal therein and subsequently changing colors to lighter shades of yellow as the reduction of cupric chloride to cuprous chloride nears completion, said method including the step of diluting the light yellow colored aqueous solution with sufficient water prior to complete reduction of cupric chloride to cuprous chloride to thereby precipitate cuprous chloride containing cupric ions entrapped therein from said solution, said method further including the step of separating the diluted aqueous solution from the precipitated cuprous chloride to provide light green colored cuprous chloride powder which contains cupric ions, wherein the improvement for producing cupric ion-free cuprous chloride comprises:
 (a) applying an electromotive force to said aqueous solution after the reduction of cupric ions nears completion to insure the complete reduction of cupric ion to cuprous ion, said applied electromotive force being sufficient to completely convert cupric ions in said acidified solution to cuprous ions to provide a clear solution which is substantially cupric ion free, said improvement further including the steps of evaporating the acidified clear solution to produce a white cuprous chloride powder which is free of cupric ions, said electromotive force being applied during said evaporation.

8. The improved method according to claim 7 wherein said electromotive force is applied to said solution by interconnecting a platinum metal electrode and a copper metal electrode immersed in said solution.

9. The improved method according to claim 8 wherein said electromotive force is applied to said solution only after the cupric ion concentration in said solution is sufficiently low to provent spalling of the copper metal electrode when the interconnected copper and platinum electrodes are immersed in the solution.

10. The improved method according to claim 9 wherein a sufficient amount of copper metal is immersed in the cupric chloride solution to react with and reduce only about 98 to 99.5 percent of the cupric ion to cuprous ion, said improved method including the additional steps of:
 (a) reacting said copper metal with said cupric chloride solution for a sufficient time to consume substantially all of said copper metal to produce a solution in which from 98 to 99.5 percent of said cupric ions have been reduced to cuprous ions; and
 (b) immersing said copper electrode and platinum electrode into the cupric ion depleted solution to thereby insure complete reduction of the cupric ions to cuprous ions.

11. The improved method according to claim 9 wherein an amount of copper metal in excess of the amount necessary to reduce all of the cupric ions in the solution to cuprous ions is added to the cupric chloride solution in a first reaction vessel, said excess amount of copper being allowed to react with said cupric ions for a sufficient time to produce a light yellow colored solution in which reduction of cupric ions is near completion, said improved method further including the steps of:
 (a) transferring said light yellow colored solution from said first reaction vessel to a second reaction vessel, said transfer being accomplished without exposure to air; and
 (b) immersing said interconnected copper electrode and platinum electrode into said solution in said second reaction vessel for a sufficient time to reduce essentially all of the remaining cupric ion in the solution in said second reaction vessel to cuprous ion.

12. An improved method according to claim 7 including the further step of purifying said white cuprous chloride powder to remove anion impurities by zone refining.

* * * * *